Patented Sept. 21, 1948

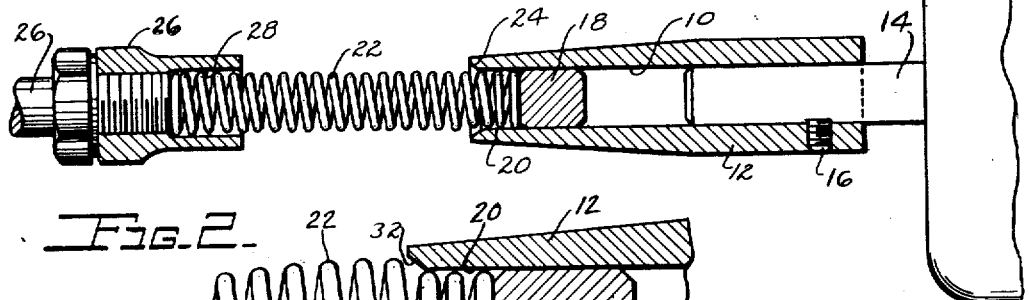
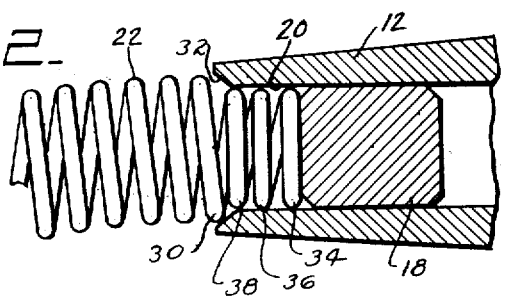
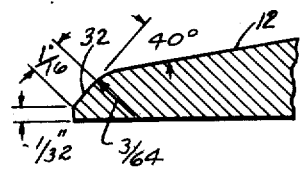
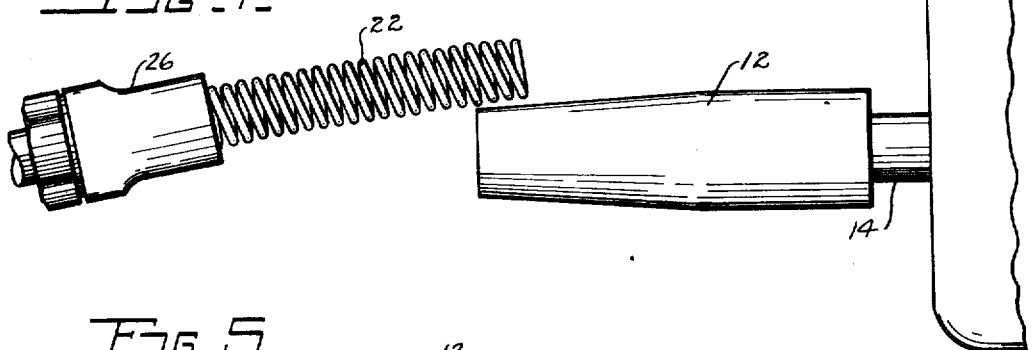
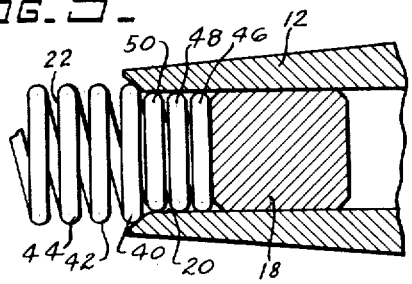

2,449,555

UNITED STATES PATENT OFFICE 2,449,555

OVERLOAD RELEASE FLEXIBLE COUPLING

Werner B. Hopkins and Ture T. Oberg,
Dayton, Ohio

Application November 28, 1945, Serial No. 631,457

5 Claims. (Cl. 192—56)

(Granted under the act of March 3, 1883, as
amended April 30, 1928; 370 O. G. 757)

The invention described herein may be manufactured and used by or for the Government for governmental purposes without the payment to us of any royalty thereon.

This invention relates to flexible couplings and particularly to a flexible coupling having overload declutching characteristics.

An object of the invention is to provide a flexible coupling which will completely sever driving connection between the driving and the driven members upon the coincident application of an overload and/or the occurrence of too great axial misalignment between the driving and driven members of the drive. Such a flexible coupling is particularly applicable for use in connection with a rotating-beam-tube fatigue testing machine such as is shown in Patent No. 2,376,379, dated May 22, 1945, to T. T. Oberg, one of the joint inventors herein, the coupling of the present invention being intended to take the place of the coupling of the patent, supra, which is therein indicated generally by the numeral 13 in the upper right portion of Fig. 1 of that patent.

Another object is to provide a flexible coupling which will interrupt driving connection automatically at a selected overload.

Another object of the invention is to provide a flexible coupling of this character which has a simple and effective means of varying the torque or the driving angle at which complete release between the driving and the driven members will be brought about.

Other objects and advantages will appear as the invention is further described and reference is had to the drawing, wherein:

Fig. 1 shows a complete flexible coupling partly in section made in accordance with our invention.

Fig. 2 is an enlarged view showing in exaggeration the action of the coupling in breaking driving connection due to too great overload and/or driving angle.

Fig. 3 is a further enlarged view depicting one example of the camming surface upon which our device depends for operation.

Fig. 4 is a view of the coupling after it has automatically separated the driving and driven elements from driving connection due to overload and too great angularity in the drive.

Fig. 5 is an enlarged view showing in exaggeration the action of the device when it is about to declutch from overload only.

Like reference characters refer to like parts throughout the several views.

The bore 10 of the driving member 12 of the coupling is slidable axially on the motor shaft 14 or other suitable source of rotative power. The member 12 is provided with a setscrew 16 whereby it may be moved along the motor shaft and secured in a selected axial position. A plug 18 preferably of soft metal, such for instance as aluminum, is press fitted into the bore 10, leaving a relatively shallow socket 20 for the end of the spring 22. In the embodiment of the invention herein shown and described the depth of the socket 20, measured from the front of the driving member 12 to the forward face of the plug 18, is equal to approximately three and one-half turns of the spring, and approximately one fourth of this depth is bellmouthed as at 24. The outside diameter of the spring 22 should be made slightly larger than the bore of the socket 20. The end of the spring may then be easily wrung into the socket by turning the spring anti-clockwise viewed from left to right. The spring 22 in the coupling herein shown by way of example is made of .062" piano wire, wound right hand, eleven coils per inch and is two and five eighths inches long. The matter of the shape and proportions of the socket 20 and the spring 22 with respect to each other are critical in a given case but will vary widely with the load which is to be carried and the overload and angularity at which the driving and driven members are to be automatically drivably disconnected. An example of the shape of the bellmouthed end of the socket 20 is shown in Fig. 3 where dimensions are given for the particular coupling shown by way of illustration. It will be understood, however, that these dimensions will be correct only for the exemplification shown.

The driven member 26 may preferably be bored to form a socket 28 of the same inside diameter as the socket 20 of the driving member 12, but of a much greater depth. In the exemplification shown this depth is such as to receive about five turns of the spring. The driven member may conveniently be wrung on to the spring by turning it anticlockwise viewed from right to left and it may be soldered or similarly fastened permanently on the spring. The operation of the device when used to declutch upon application of overload, as well as upon increase in the angularity of the drive, is as follows:

When the spring 22 is wound right hand as in the drawing, the motor shaft 14 should rotate clockwise when viewed from right to left in order that the portion of the spring 22 which is contained in the socket 20 will expand and grip the socket with sufficient pressure to carry the normal load. This unidirectional clutching action is well known and understood in the art of coil type overrunning clutches. When the normal load is assumed by the driven member 26, that is, the load at which the coupling members should remain in engagement, the turns of the spring which are not confined in the sockets 20 and 28 will enlarge slightly, but not enough to effect disconnection of the drive.

When, however, due to overload, or because of the angularity of the drive or both, the spring enlarges until a turn as at 30, Fig. 2, presses outward against the angular portion 32, the angular portion has a camming action by which the turns 34, 36, 38 are drawn forward and out of the socket, and if the coupling is being used in connection with the rotating-beam-tube testing machine, supra, the angularity of the drive resulting from a failure of the test specimen will cause the spring 22 to assume a position shown in Fig. 4, whereby the member 12 may continue to rotate but it will be completely out of contact with the end of the spring 22.

The foregoing description of the operation of the invention applies particularly to the use of the coupling in connection with the machine shown in Patent No. 2,376,379, supra, for the reason that as much as thirty degrees angularity occurs in the drive at the instant of failure of the test specimen of the machine, and this is the point at which the drive must be interrupted. The coupling may, however, be advantageously employed for disconnecting the drive upon overload only. In such cases the action is as depicted in Fig. 5.

Fig. 5 shows how the turns 40, 42, 44 etc. which are not confined in the socket 20 may expand, due to sufficient overload, and bear against the bell-mouthed end of the socket and cam the driving turns 46, 48, 50 one by one forward and out of the socket. As each turn is cammed from the driving portion of the socket, it in turn expands and cams the next turn forward, the entire declutching action being accomplished almost instantly after expansion of a coil has broken the static friction between the driving turns and the socket.

If, upon trial, it is found that the coupling declutches upon application of a torque which is lower than that desired, the setscrew 16 may be loosened and the member 12 shifted axially to put the spring 22 in compression, whereby a greater force will be required to withdraw the turns 46, 48, 50, from the driving socket 20 and consequently a greater torque will be required to enlarge the turns 40, 42, 44 to an extent where the turn 40 will bear sufficiently against the bevel of the bellmouth to withdraw the driving turns against the increased force of the axially compressed spring.

While in the foregoing we have shown and described several uses to which our improved coupling may be put, it will be understood that many other uses may be found for the invention.

Having described our invention, we claim:

1. A coupling of the character described adapted for a preselected direction of rotation, which comprises a driving member, a driven member normally coaxial with and axially spaced apart from said driving member, interfacing ends of said members being provided with cylindrically bored sockets, the socket of the driving member being of much less depth than the socket of the driven member and having a bellmouthed end, a coil spring formed of round wire, coiled to an outside diameter very slightly larger than the bore of said sockets and of a length to drivably connect said spaced apart driving and driven members when the end coils of said spring are contracted and seated in said sockets, the helix of said spring being of such "hand" as will tend to enlarge the diameter of the spring when a load is applied thereto in said preselected direction of rotation, and the strength of the spring being such that a normal load applied in said preselected direction will enlarge the diameter of that part of the spring not contained in the sockets very slightly but a preselected overload applied in said preselected direction will enlarge the diameter of the spring to such an extent that the turns of the spring will press radially against the angle of the bellmouth and thereby remove the end of the spring from the driving member socket.

2. The device of claim 1 with means for selectively shortening the axial distance between the driving and driven members whereby the spring is placed in compression.

3. A coupling of the character described adapted for a preselected direction of rotation which comprises a driving member, a driven member normally coaxial with and axially spaced apart from said driving member, the inner end of said driving member being provided with a cylindrically bored socket having a bellmouthed end, a coil spring formed of round wire, coiled to an outside diameter very slightly larger than the bore of said socket and of a length to drivably connect said spaced apart driving and driven members when the end coils at one end of said spring are contracted and seated in said socket and the end coils at the other end of said spring are drivably secured to the driven member, the helix of said spring being of such "hand" as will tend to enlarge the diameter of the spring when a load is applied thereto in said preselected direction of rotation and the strength of the spring being such that a normal load applied in said preselected direction will enlarge the diameter of that part of the spring not contained in the socket very slightly but a preselected overload applied in said preselected direction will enlarge the diameter of the spring to such an extent that the turns of the spring will press radially against the angle of the bellmouth and thereby remove the end of the spring from the driving member socket, and means to vary the axial length of said spring.

4. In a coupling, adapted for a preselected direction of rotation a driving member, a coaxial driven member axially spaced apart from said driving member, a cylindrically bored socket in the end of the driving member having a bellmouthed end, a coil spring coiled to an outside diameter very slightly larger than the bore of said socket and of a length to drivably connect said spaced apart driving and driven members when the end coils at one end of said spring are contracted and seated in said socket and the other end of said spring is drivably attached to said driving members, the helix of said spring being of such "hand" as will tend to enlarge the diameter of the spring when a load is applied thereto in said preselected direction of rotation, and the strength of the spring being such that a preselected overload will enlarge the diameter of the spring to such an extent that the turns of the spring will press radially against the angle of the bellmouth and thereby remove the end of the spring from the said socket.

5. In a coupling, adapted for driving in a preselected direction of rotation a driving member, a driven member, a cylindrical socket having a bellmouthed end in one member, a coil spring normally having an outside diameter slightly larger than said socket, the coils at one end of said spring being contracted and seated in said socket and the other end being drivably connected to the other member, the helix of said spring being such that a preselected overload applied in said preselected direction will enlarge the diameter of the spring to such an extent that the turns of the spring will press radially against the angle of the bellmouth and thereby remove the end of the spring from the socket.

WERNER B. HOPKINS.
TURE T. OBERG.

REFERENCES CITED

The following references are of record in the file of this patent:

UNITED STATES PATENTS

| Number | Name | Date |
|---|---|---|
| 1,126,780 | Jones | Feb. 2, 1915 |